United States Patent
Wei et al.

[11] Patent Number: 5,772,081
[45] Date of Patent: Jun. 30, 1998

[54] LOW LEAKAGE ROTARY VALVE

[75] Inventors: Shyan-Chiin Wei; Wei-Chong Tsai, both of Hsin-chu, Taiwan

[73] Assignee: Food Industry Research and Development Institute, Hsinchu, Taiwan

[21] Appl. No.: 658,065

[22] Filed: Jun. 4, 1996

[51] Int. Cl.$^6$ .................................................. G01F 11/10
[52] U.S. Cl. ........................................ 222/368; 414/219
[58] Field of Search ............................ 222/368; 414/219

[56] References Cited

U.S. PATENT DOCUMENTS

| | | | |
|---|---|---|---|
| 2,766,911 | 10/1956 | Greaves et al. | 222/368 |
| 3,151,784 | 10/1964 | Tailor | 222/368 |
| 3,273,758 | 9/1966 | Starrett | 222/368 |
| 3,556,355 | 1/1971 | Ruiz | 222/368 |
| 3,633,797 | 1/1972 | Graff | 222/368 |
| 4,059,205 | 11/1977 | Heyl | 222/368 |
| 4,072,253 | 2/1978 | Walters, Jr. | 222/368 |
| 4,180,188 | 12/1979 | Aonuma et al. | 222/368 |
| 4,473,092 | 9/1984 | Becker | 222/368 |
| 4,915,265 | 4/1990 | Heep et al. | 222/368 |
| 5,014,885 | 5/1991 | Heep et al. | 222/368 |
| 5,201,441 | 4/1993 | Hoppe et al. | 222/368 |
| 5,303,672 | 4/1994 | Morris | 222/368 |
| 5,392,964 | 2/1995 | Stapp et al. | 222/368 |
| 5,472,305 | 12/1995 | Ikeda et al. | 414/219 |
| 5,544,995 | 8/1996 | Ogawa et al. | 414/219 |
| 5,620,116 | 4/1997 | Kluger et al. | 222/368 |

*Primary Examiner*—J. Casimer Jacyna
*Attorney, Agent, or Firm*—W. Wayne Liauh

[57] ABSTRACT

A low leakage rotary valve composes of a housing, a rotor, a driving end valve cover and a washing end valve cover. The driving end valve cover and the washing end valve cover are to secure the rotor in the housing. The driving end valve cover houses a detachable driving shaft which can transmit an external driving force to the rotor for rotation. The washing end valve cover allows the rotor to be removed for cleaning. Inside the driving end valve cover and washing end valve cover, there are provided respectively a sealing ring to prevent the material contained in the valve from contamination or to avoid pressure leakage. The edge of the blades of the rotor is extended to reduce gas leakage. A three-dimensional sealing is integrally provided on the outer edges of the rotor blades and the circumferential edges of the driving end valve cover and the washing end valve cover to further prevent gas leakage that may occur. Thereby the passage from the upper opening, housing and lower opening is tightly sealed to prevent gas leakage.

5 Claims, 7 Drawing Sheets

LOW LEAKAGE ROTARY VALVE

BACKGROUND OF THE INVENTION

1. Field of the Invention

This invention relates to a rotary valve and particularly to a rotary valve which is capable of reducing static gas leakage rate below one-eighth of a conventional rotary valve when no sealing ring installed, and also has washable features for enhancing sanitation

2. Description of the Prior Art

Conventional rotary valve used in industries is usually for transporting particle or granular products or materials, such as chemical, biomedical, biochemical and food materials, etc. It usually is installed between a hopper and a conveyer for continuous feeding or discharging, such as in a continuous steam sterilizer, continuous vacuum cooler, etc. As there is a pressure difference between the inside of the material processing equipments and the ambient surroundings, steam or air will leak out or flow in through the rotary valve. Leakage rate is usually very high in a conventional rotary valve, thereby resulting in significant pressure loss in the material processing equipments.

As is generally known, a conventional rotary valve is typically composed of a housing, two end covers and a rotor. The housing is usually made by casting. End cover usually has a hollow interior which can save material but creating clogging and cleaning problems. The rotor may be integrated formed with six or eight blades. Greater rotor diameter often creates greater leakage problem. In order to reduce leakage rate, some try to screw a soft sealing material on the blade edge. While it can reduce leakage rate, the screw is prone to stick material and difficult to clean. For rotor transmission, some use a separated linear driving shaft. It has to rotate 180 degrees for installing correctly.

SUMMARY OF THE INVENTION

In view of the problems and disadvantages in the conventional rotary valve mentioned above, this invention intends to provide a wider blade edge in the rotor than that of conventional one. Applying the theory of "at a given gap, the greater the length the greater the resistance", the leakage rate thus can be greatly reduced. Furthermore the driving end cover and the washing end cover have respectively a sealing ring disposed therein to prevent the material from contamination by the lubrication oil. It can also help to reduce the leakage of pressurized gas in the rotary valve. There is also an integrated sealing disposed on the blade edges of the rotor to further prevent the gas leakage.

Experiments show that after adopting the present invention, leakage rate can be dropped to one eighth of a conventional rotary valve under static condition. When integrated sealing is installed on the blade edge, almost no leakage takes place there.

It is therefore an object of the present invention to provide a rotary valve with the width of the rotor blade edge twice long of a conventional rotary valve, and thus can reduce gas leakage under same gap distance.

It is another object of the present invention to provide a rotary valve with an integrated sealing disposed on the rotor, and thereby by the integrated sealing, each gap between the rotor and housing being divided into two parts, one of which is completely isolated from the other so as to isolate the gas in the feeding opening from the gas in the discharging opening, and so as to prevent gas leakage in the rotor and housing through each gap.

It is yet another object of the present invention to provide a sealing ring respectively in the driving end valve cover and the washing end valve cover so that material contained in the rotary valve will not be contaminated by the lubricating oil in the bearing, and the pressurized gas in the valve will not be leaked out through the driving and washing end valve covers.

It is still another object of the present invention to provide a rotary valve which is not limited for utilizing in material processing equipments but can also be used for continuous transportation of powders or granular materials, and to solve the problems of excessive leakage and energy consumption.

DETAILED DESCRIPTION

Figure 1:
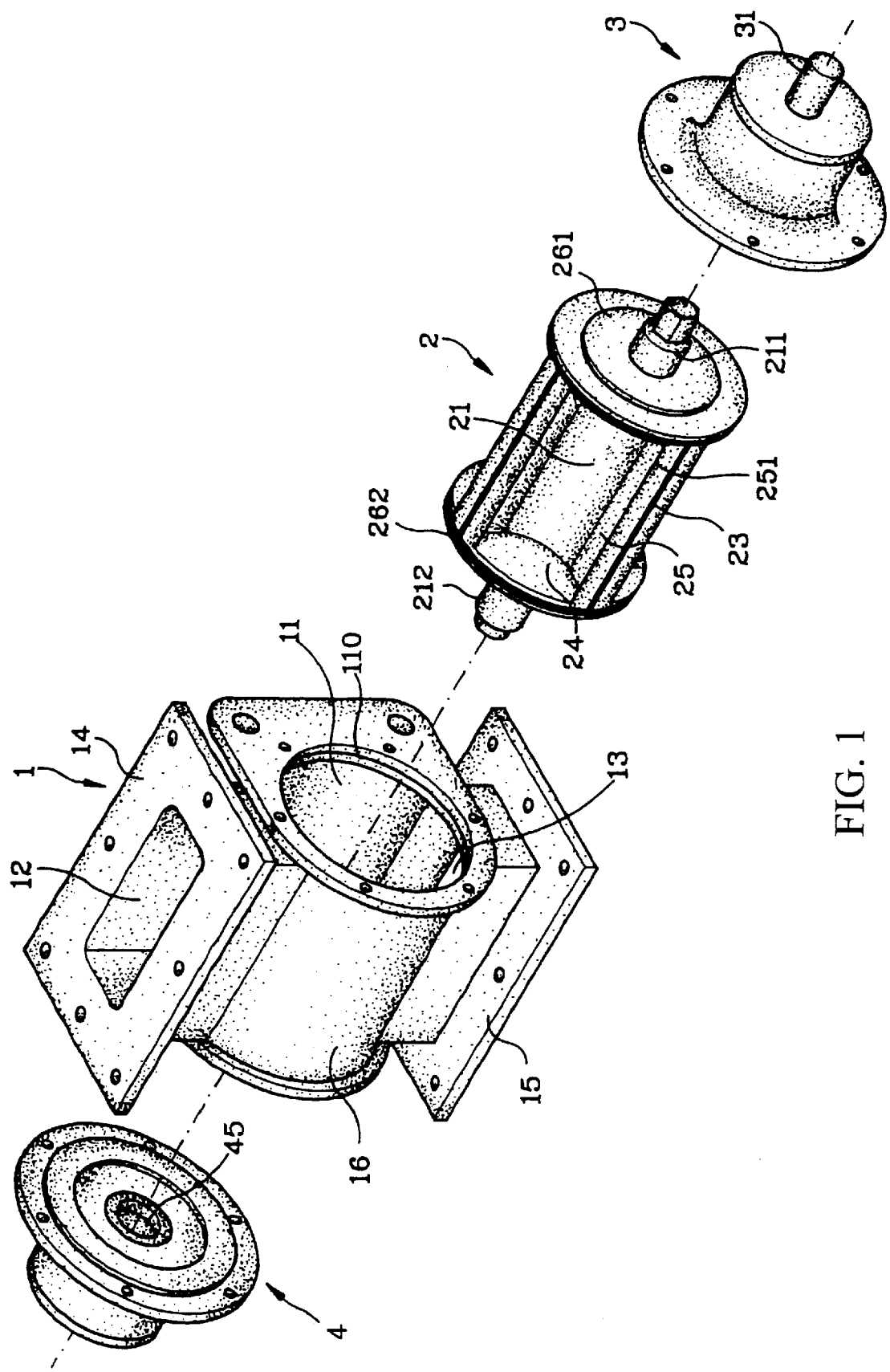
FIG. 1 is an exploded view of a rotary valve of the present invention.
Figure 2:
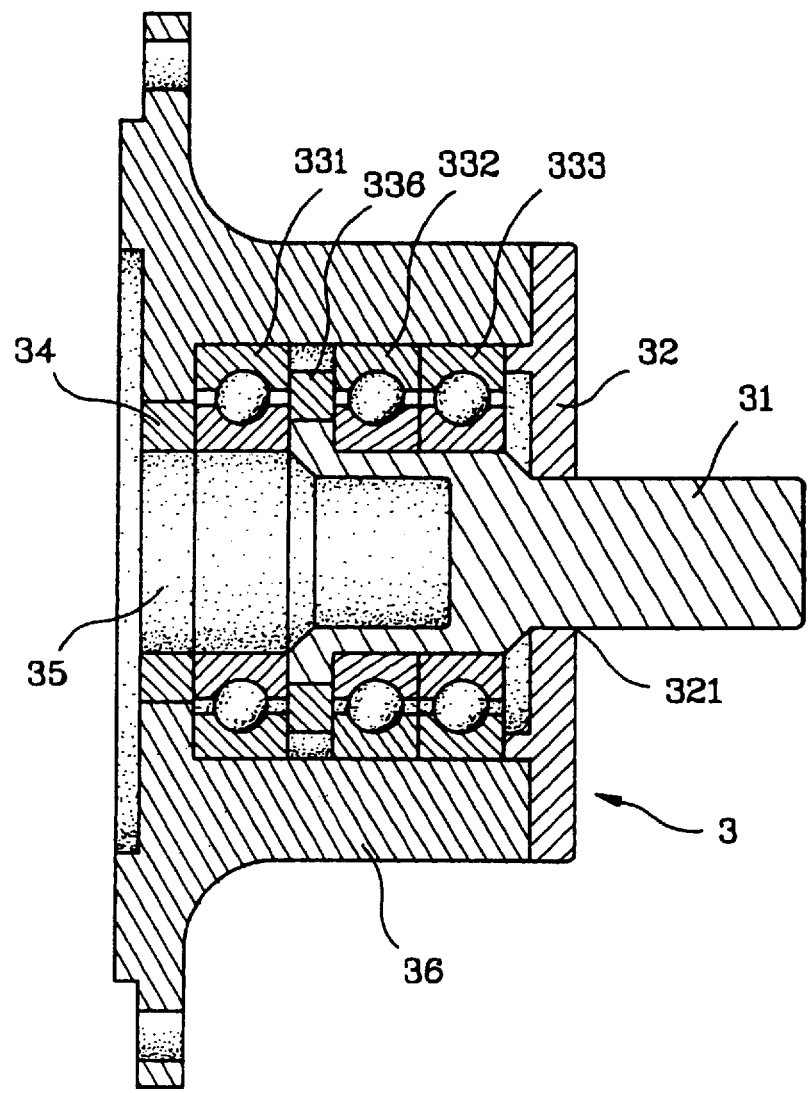
FIG. 2 is a sectional view of a driving end valve cover of the present invention.
Figure 3:
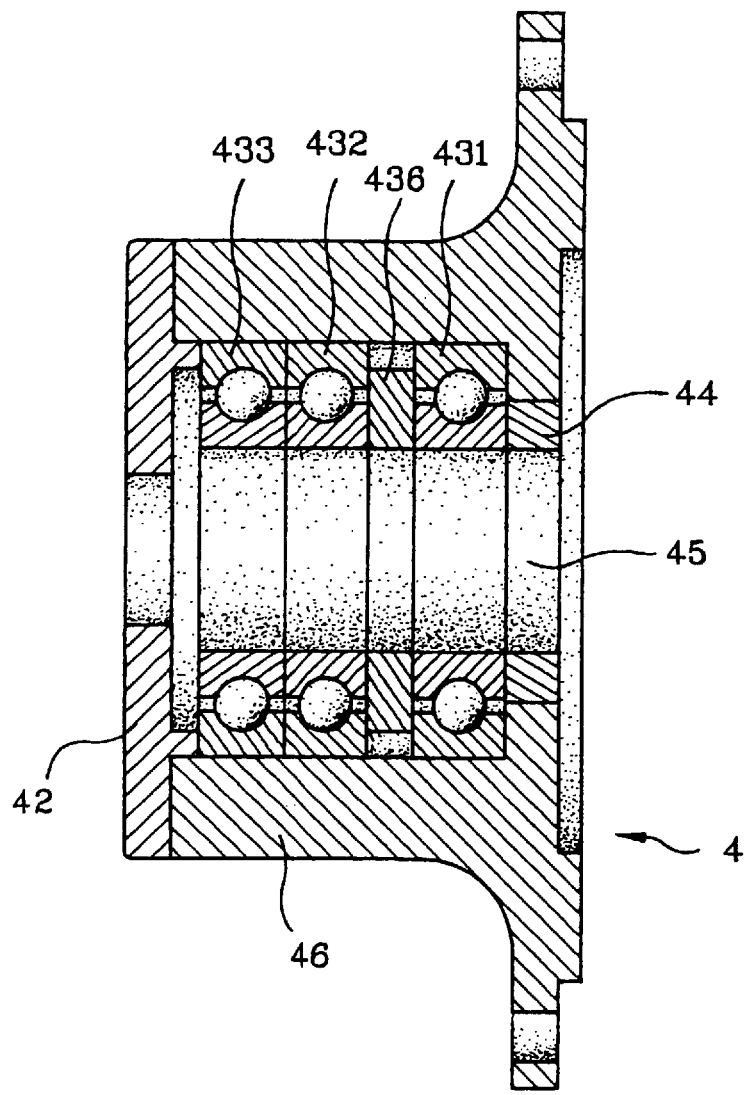
FIG. 3 is a sectional view of a washing end valve cover of the present invention.
Figure 4A:
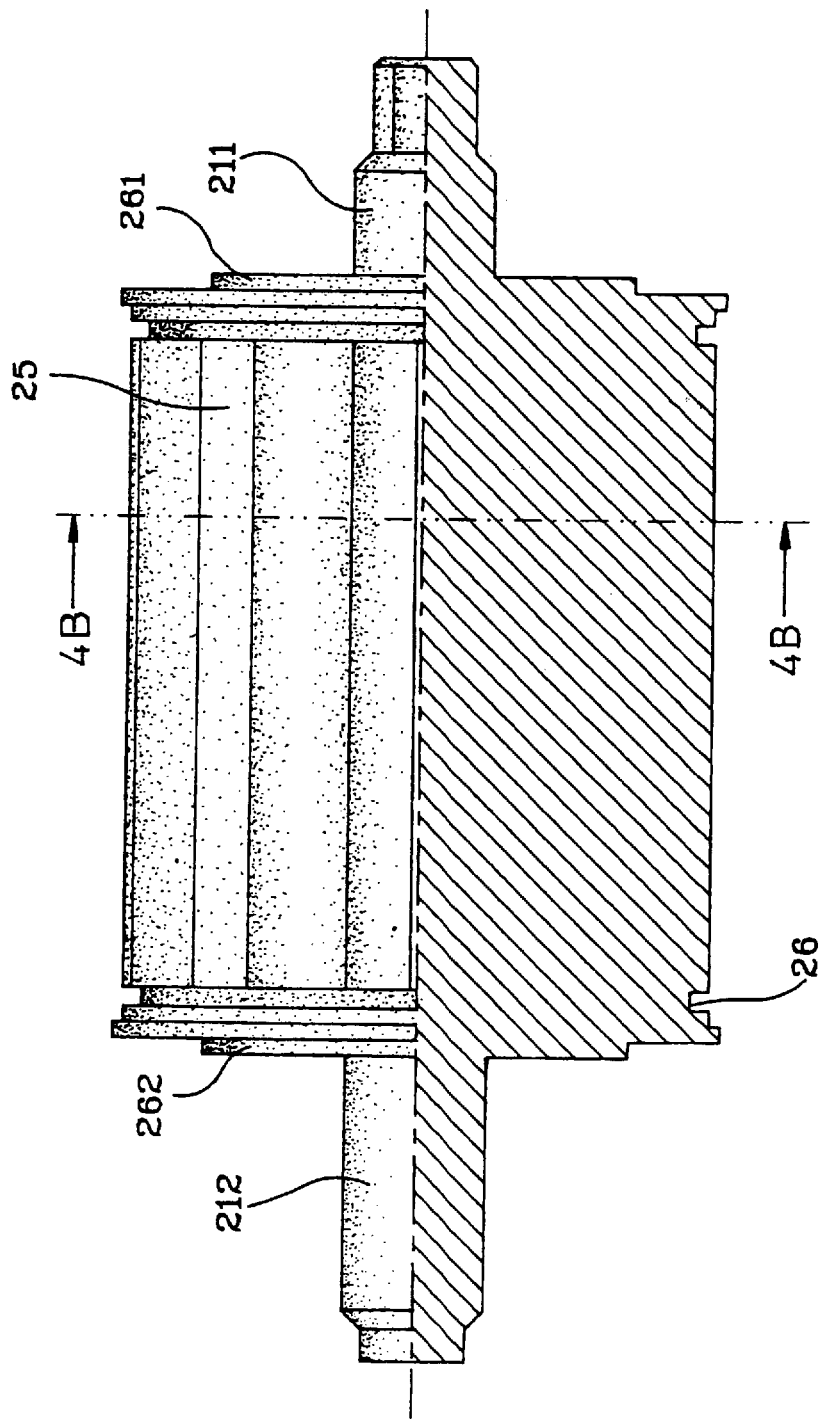
FIG. 4A is a front perspective view, partly cut off, of the rotor of the present invention.
Figure 4C:
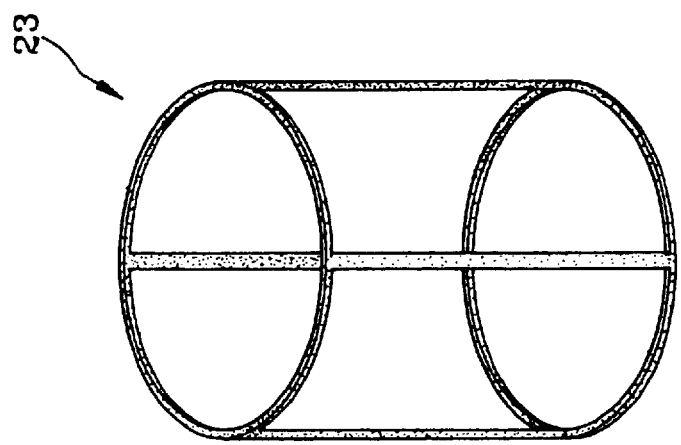
FIG. 4C is a pictorial view of a sealing for a rotor of the present invention.
Figure 4B:
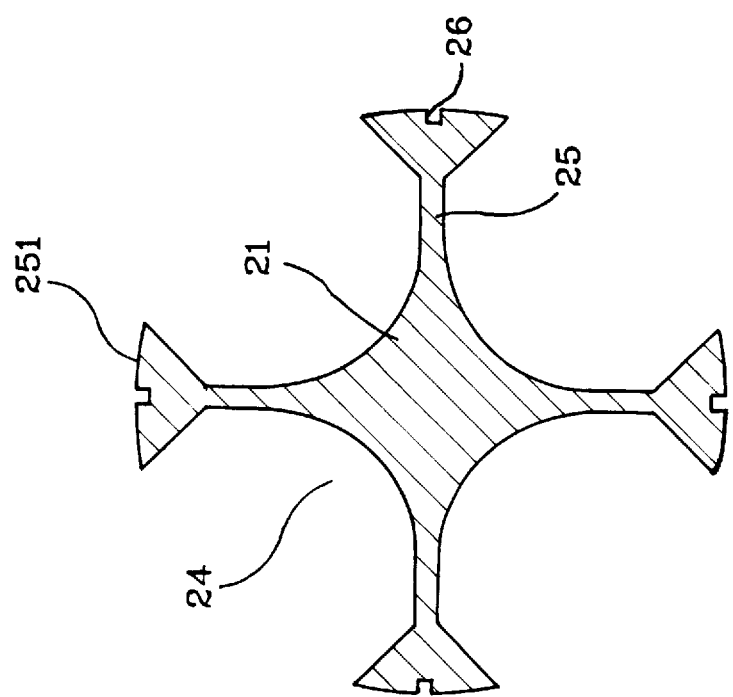
FIG. 4B is a sectional view of a rotor taken on line A–A of FIG. 4A.

Referring to FIGS. 1 through 5, a rotary valve (7) of the present invention generally comprises includes a housing (1), a rotor (2), a driving end valve cover (3) and a washing end valve cover (4).

The housing (1) is made by integrated casting and milling process. There is a loading opening (11) disposed horizontally in the housing (1) for holding the rotor (2) within a hollow cylindrical casing (16). The loading opening (11) has a stepped crosssection (110) for smooth installation of the rotor (2). On the top of housing (1) is an upper opening (12) which has an upper flange (14). Under the bottom of housing (1) is a lower opening (13) which has a lower flange (15). The upper flange (14) engages with the hopper flange (711) of a hopper (71). The lower flange (15) engages with the sterilizer flange (721) of a continuous steam sterilizer (72). Raw material is loaded from the hopper (71), then passes through upper opening (12), and enters into the holding space (24) of the rotor (2). Upon the rotation of the rotor (2), raw material is fed into the lower opening (13) and entered into the continuous steam sterilizer (72).

Rotor (2) includes an integrated formed rotor shaft (21) which has a driving end of rotor shaft (211) at the driving end valve cover (3) and a washing end of rotor shaft (212) at the washing end valve cover (4). Around the rotor shaft (21), there are provided four rotor blades (25) extending radially outward. Each rotor blade (25) has an extended blade edge (251) which has twice width of a conventional rotor blade. Therefore the flow resistance in the gap between the rotor blade edge (251) and the housing (1) increases significantly. The leakage resistance of the gas can be greatly reduced based on the theory of "at a given gap, the greater the gap length the greater the resistance". At two ends of the rotor (2) there is provided respectively a driving end disk (261) and a washing end disk (262) to form a holding space (24) therebetween. Materials such as chemical, biomedical, biochemical and food materials, etc., can be fed into the valve from the upper opening (12), entering into the holding space (24), and then be transportated to the lower opening (13). An integrated formed sealing (23) is disposed in the slots (26) of the rotor blades (25) and around the peripheral edges of the driving end disk (261) and of the washing end disk (262) to prevent the leakage of pressured gas.

The driving end valve cover (3) (referring to FIG. 2) includes a first end cover (32) for covering other components in a first hollow cylindrical end case (36). At the left side is a first hollow cylindrical end case (36). In the center of the first end cover (32) is a first cover opening (321) for allowing a driving shaft (31) to pass through. The inner end of the driving shaft (31) engages with the driving end of rotor shaft (211). Thus driving shaft (31) can drive rotor (2) to rotate. On the left end of the driving shaft (31) is a driving end receptacle (35) for housing the driving end of rotor shaft (211). Within the first hollow end case (36) and around the receptacle (35), there are provided with a first bearing (331), a first separating ring (336), a second bearing (332) and a third bearing (333). On the left of the first bearing (331) is a first sealing ring (34) for preventing the material from contamination by the lubricating oil in the bearings. The material can also be prevented from entering into the bearings. It can also prevent the pressure loss or prevent outside air from entering into the valve.

Washing end valve cover (4) includes a second end cover (42) and a second hollow cylindrical end case (46). Within the second end case (46) there are provided with a second sealing ring (44), a fourth bearing (431), a second separating ring (436), a fifth bearing (432) and a sixth bearing (433) to form a washing end receptacle (45) to allow the washing end of rotor shaft (212) to dispose therein. Rotor shaft (21) can rotate freely in the receptacle (45). Second sealing ring (44) provides similar function as that of the first sealing ring (34).

Figure 5:
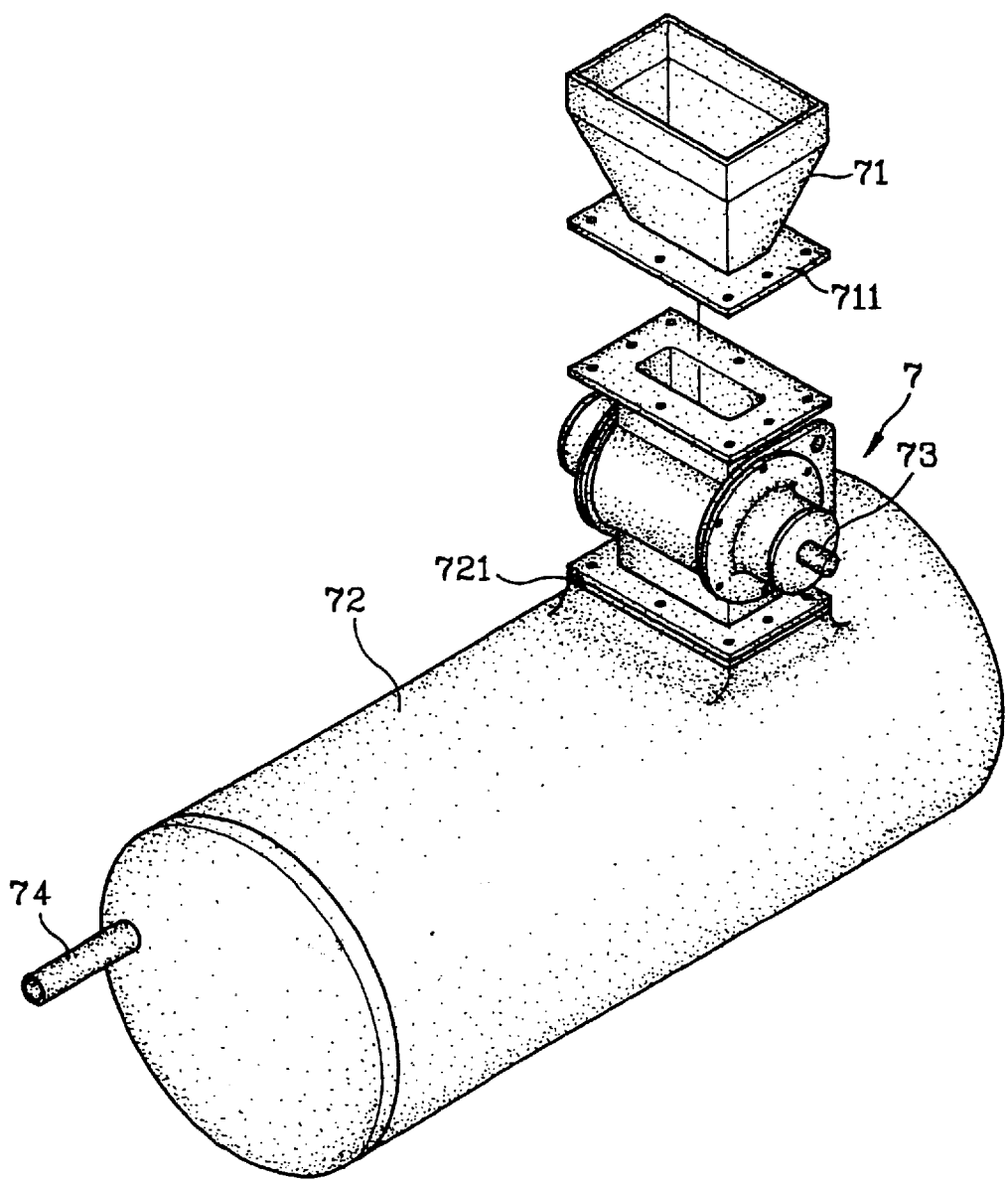
FIG. 5 is a pictorial view of the present invention used in continuous steam sterilizer.

FIG. 5 illustrates the rotary valve (7) of the present invention in use state. On the top of the rotary valve (7) is a hopper (71), under the bottom is a continuous steam sterilizer (72). The material is fed into the hopper (71), going through the rotary valve (7), then entering into the steam sterilizer (72). There is a steam input pipe (74) disposed at one end of the steam sterilizer (72). The rotary valve (7) of the present invention may be applied to chemical or biochemical machinery equally well, such as a continuous vacuum cooler.

In the present invention, the size of gap between the rotor blade and the housing depends on the processing materials and operation temperature. The longer the blade width, the better it can prevent leakage. According to the present invention, the blade edge width is preferably twice or more of the blade thickness.

Figure 6A:
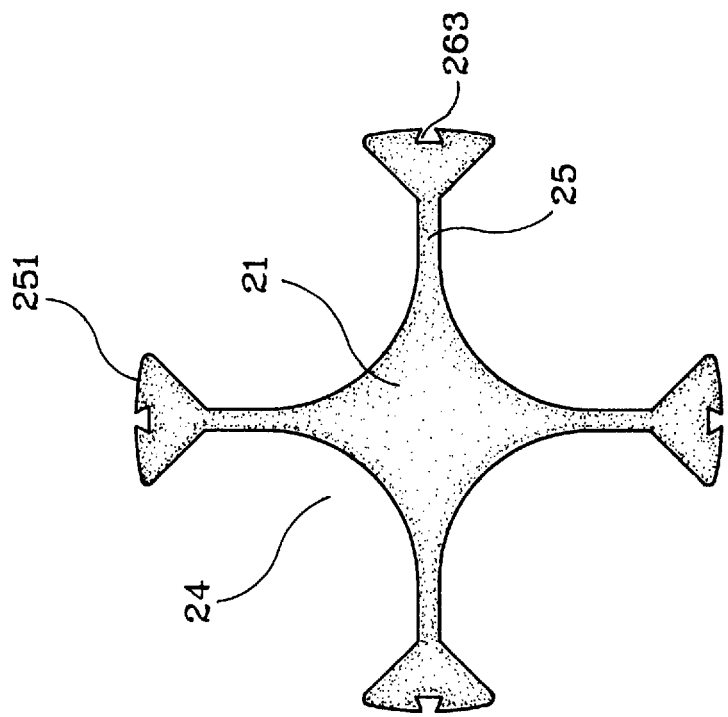
FIGS. 6A and 6B are sectional views of the rotor of the present invention showing two other different examples of slots.
Figure 6B:
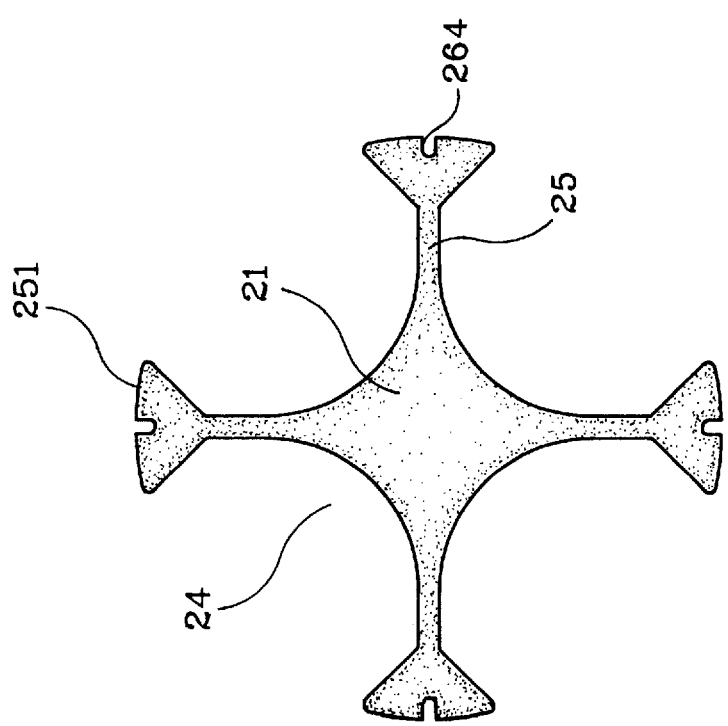

All the slots into which the sealing (23) can be disposed to prevent the leakage of pressured gas through the blade edge (251), are within the scope of the present invention. FIGS. 6A and 6B show two other different examples of slots of the present invention, i.e. arc-shaped slot (264) and wedge-shaped slot (263). Each square-shaped slot (26) has a square slot bottom. Each arc-shaped slot (264) has an arc slot bottom. Each wedge-shaped slot (263) has a wedge slot bottom.

What is claimed is:

1. A low leakage rotary valve comprising:

A rotor, which includes a rotor shaft, at least three rotor blades, a driving end disk, and a washing end disk; wherein the rotor blades, the driving end disk and the washing end disk form a holding space for containing a loading material, each of the rotor blades has a radially extended blade edge extension which is wider than the rotor blade itself, the rotor shaft extends through the driving disk to form a driving end and through the washing disk to form a washing end for allowing the rotor to rotate freely by the rotor shaft;

a housing, which includes a hollow casing, a loading opening, an upper opening having an upper flange, and a lower opening having a lower flange; wherein the loading opening allows the rotor to be disposed into the housing therethrough, the upper opening allows the loading material to load therethrough and flow into the holding space of the rotor, the lower opening allows the loading material to be discharged out therethrough;

a driving end valve cover, which includes a first hollow cylindrical end case having a first end cover attached thereto, the first end cover having a first cover opening in the center permitting a driving shaft to pass therethrough to drive the rotor; wherein the interior of the first hollow cylindrical end case has a plurality of bearings for supporting the driving end of the rotor shaft and the driving shaft, a first separating ring, which is disposed between at least two of the bearings, for supporting the driving end of the rotor and the driving shaft, and a first sealing ring, which is disposed next to the bearings and opposite the first separating ring, for supporting the driving end of the rotor shaft, and further wherein the interior of the first hollow cylinder end, together with a left end of the driving shaft, form a driving end receptacle to house the driving end of the rotor shaft to allow the rotor shaft to freely rotated therein, and the first sealing ring is disposed such that the loading material contained in the rotary valve is prevented from being contaminated by lubricating oil in the bearings and from entering into the bearings;

a washing end valve cover, which includes a second hollow cylindrical end case having a second end cover attached thereto; wherein the interior of the second hollow cylindrical case has a plurality of bearings, a second separating ring disposed between at least two of the bearings and a second sealing ring disposed therein, and forms into a washing end receptacle to house the washing end of the rotor shaft and allow the rotor shaft to freely rotated therein, and the second sealing ring is disposed such that the loading material contained in the rotary valve is prevented from contamination by the lubricating oil in the bearings, and from entering into the bearings; and a three-dimensional sealing structure, which includes a first ring-groove on a circumferential edge of the driving end disk, a second ring-groove on a radial peripheral edge of the washing end disk, a plurality axially extending grooves on an axial outer edge of the blade edge extension, and a three-dimension seal integrally received by said first ring-groove, said second ring-groove, and said axially extending grooves.

2. The low leakage rotary valve of claim 1, wherein the slot is a square-shaped slot.

3. The low leakage rotary valve of claim 1, wherein the slot is a arc-shaped slot.

4. The low leakage rotary valve of claim 1, wherein the slot is a wedge-shaped slot.

5. The low leakage rotary valve of claim 1, wherein the loading opening of the housing has stepped-crosssection for allowing smooth installation of the rotor.

* * * * *